C. F. HOPKINS.
MOLDING MACHINE.
APPLICATION FILED JULY 31, 1912.
1,054,294.
Patented Feb. 25, 1913.
2 SHEETS—SHEET 1.
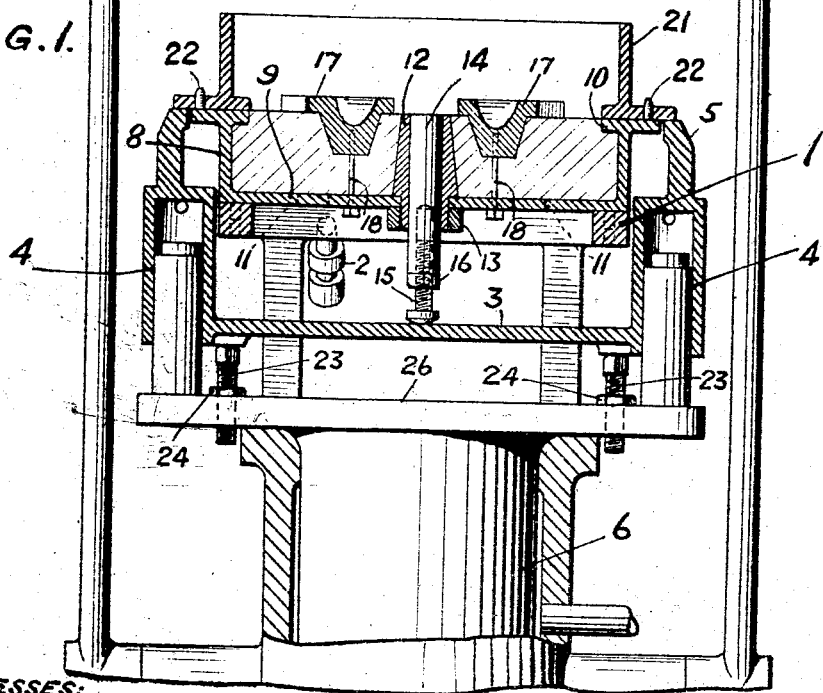

C. F. HOPKINS.
MOLDING MACHINE.
APPLICATION FILED JULY 31, 1912.
1,054,294.
Patented Feb. 25, 1913.
2 SHEETS—SHEET 2.
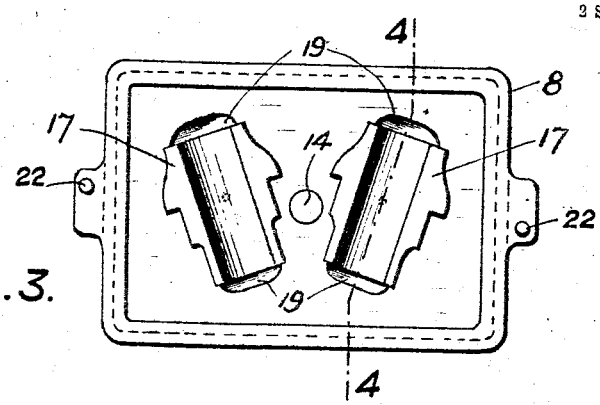
FIG. 3.
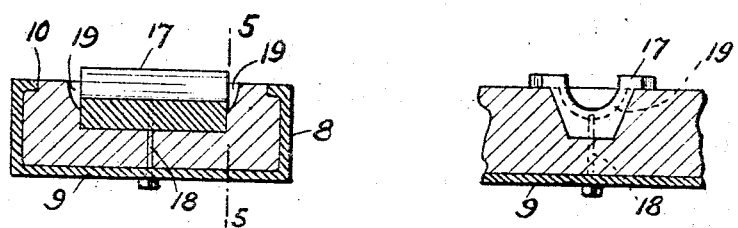
FIG. 4.    FIG. 5.
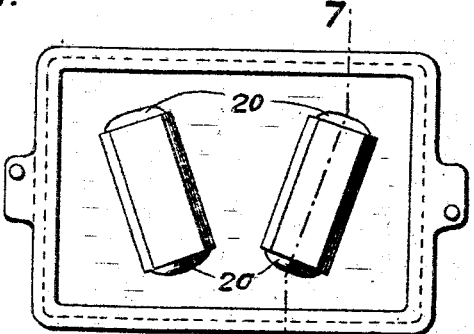
FIG. 6.
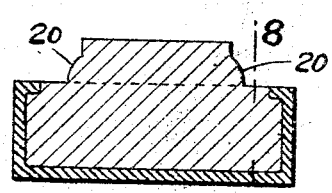   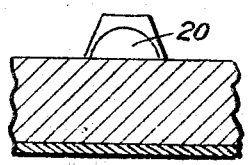
FIG. 7.    FIG. 8.
WITNESSES:
Rob R Kitchel.
Frank E French
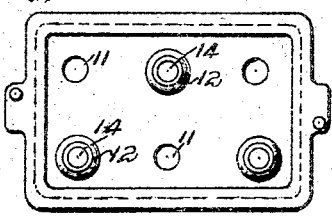
FIG. 9.
INVENTOR
Charles F. Hopkins
BY Augustus B. Stoughton
ATTORNEY.

UNITED STATES PATENT OFFICE.

CHARLES F. HOPKINS, OF PHILADELPHIA, PENNSYLVANIA, ASSIGNOR TO AJAX METAL COMPANY, OF PHILADELPHIA, PENNSYLVANIA, A CORPORATION OF PENNSYLVANIA.

MOLDING-MACHINE.

1,054,294.　　　　Specification of Letters Patent.　　Patented Feb. 25, 1913.

Application filed July 31, 1912. Serial No. 712,393.

*To all whom it may concern:*

Be it known that I, CHARLES F. HOPKINS, a citizen of the United States, and a resident of Philadelphia, in the county of Philadelphia and State of Pennsylvania, have invented certain new and useful Improvements in Molding-Machines, of which the following is a specification.

The principal object of the present invention is to avoid hand-ramming and hand-drawing and to provide, without splitting the pattern and machining the joints, a comparatively inexpensive split pattern that will coöperate with a power molding machine and give successful molds without requiring skill on the part of the operator.

The invention will be claimed at the end hereof, but will first be described in connection with what I believe to be the best, although not the only, embodiment thereof, which embodiment I have illustrated in the accompanying drawings, in which—

Figure 1, is an elevational view, partly in section, illustrating parts of a molding machine embodying features of the invention. Fig. 2, is a top or plan view of a box without its filling and which replaces or takes the place of the ordinary split pattern or match plate or vibrator plate. Fig. 3, is a top or plan view of the box shown in Fig. 2, with its filling in place. Fig. 4, is a sectional view on the line 4—4 of Fig. 3. Fig. 5, is a sectional view on the line 5—5 of Fig. 4. Fig. 6, is a top or plan view of a box like that shown in Fig. 2, with its filling and arranged to make one half of the mold, the other half of which is made by the box shown in Fig. 3. Fig. 7, is a sectional view on the line 7—7 of Fig. 6. Fig. 8, is a sectional view on the line 8—8 of Fig. 7, and Fig. 9, is a view similar to Fig. 2, illustrating a plurality of stools and their thimbles.

In the drawings 1 is a pattern carrier support, which may be the vibrator frame, in which case it is provided with a vibrater 2. 3, is a stool plate. 4, are the draft pistons and cylinders. 5, is the flask frame. 6, is the ramming piston and cylinder and 7 is the ramming or squeezing head. The piston and cylinder 6 lift all the parts in respect to the ramming head and the pistons and cylinders 4 lift the flask frame 5 and the stool plate 3 in respect to the part 1. All of these parts are well understood and I may say that I prefer to use the power molding machine, as a slow squeezer, but I do not intend to exclude the use, at least for certain purposes, of power jarring or ramming machines in connection with my invention.

8, is a receptacle or box having a bottom 9 integral therewith or attached thereto. This box may be constructed of metal and is shown as provided at its top with an inturned flange or lip 10 and at its bottom with holes 11. Where stools are to be used the box is provided with metal thimbles 12 one for each stool shown as extending through its bottom and up to the parting line and held to place by an external nut 13. The stools 14 work each through its thimble 12 and may each be provided with a screw 15 having a jam nut 16. The head of the screw may advantageously be made rounded, so as to bear at one point upon the stool plate and thus assure proper freedom of motion of the stool through the thimble, even though some sand may work under the head of the screw. The screws afford means for adjusting the stools and the jam nuts 16 afford means for retaining such adjustments.

It will be understood that in most, if not all, cases it will be necessary in order to make the mold to employ two boxes which may be used on separate power molding machines and of which one makes the cope and the other the drag. The filling of one of these boxes, the one shown in Figs. 3—5, consists of a material which is designated herein as plaster, and of the pattern 17, as of metal, a portion of which projects from the plaster. This material called plaster should be capable of being inserted into the box and thereafter of setting. Plaster of Paris is an example of material that I have used. The filling of the other box, shown in Figs. 6—8 consists of plaster. The pattern 17 may be held to place, if desired, by the tie-rod 18 passing through the bottom of the box, thus the weight of the pattern is carried by the bottom of the box and not by the plaster when the box is inverted. The plaster may be introduced into the boxes through the holes 11, when present. The disposition and arrangement of the thimbles 12 and stools 14 will depend, of course, upon the shape of the patterns and their arrangement in the box.

The face contour of the plaster may be said to be the parting; for example, it will be observed that there are concavities 19, Figs. 3—5, and projections 20, Figs. 6—8, which are complemental and control the parting of the two parts of the mold. The box and the cope or drag 21, as the case may be, are detachably connected by pins passing through suitable holes, i. e. by flask guides. As shown the pins 22, are attached to the box, and since they constituted the guides when the fillings of the boxes were made, proper alinement is insured. The box 8, is mounted on or connected with the support 1 and in the making of molds the machine is operated in the ordinary way. Evidently both boxes may contain only plaster in which case both boxes would be like Fig. 7, differing only in the form of that part of the pattern which is effective in respect to the parting line; or otherwise stated, one box would be like that shown in Fig. 7 and the other like that shown in Fig. 5, but with all parts there shown constructed of plaster, or both may contain the pattern or portions thereof and plaster, in which case both boxes would be like Fig. 5, except that the shape of the part of the pattern effective in respect to the parting line, would be different. The depth of the box should be fixed with regard to the work in hand, so that in practice the boxes are or may be of different depths. In consequence of this it is desirable to provide for alining the flask frame 5 with the parting surface or top of the box when the parts are in ramming, squeezing, or jarring position; for this purpose adjustments are provided and the screws 23 and lock-nuts 24 interposed between the part 3, and the part 26 which is raised by the piston 6, are examples of such adjustments.

It will be obvious to those skilled in the art to which my invention relates that modifications may be made in detail, hence I do not desire to limit my invention further than the state of the prior art may require.

What I claim is:

1. In a molding machine the combination of a pattern carrier, a flask frame, means for moving the carrier and frame in respect to each other to draw a pattern, means for moving the carrier and frame together to ram, a pattern box containing a filling of which the face contour controls the parting and the part of the pattern that extends beyond the parting, and flask guide pins connected with the pattern box, in contra-distinction to any part of the molding machine, whereby the proper position of said part of the pattern in respect to the pins and to the other part of the pattern is insured and maintained.

2. In a molding machine the combination of a pattern carrier, a flask frame, means for moving the carrier and frame in respect to each other to draw a pattern, means for moving the carrier and frame together to ram, a pattern box containing a filling of which the face contour controls the parting and the part of the pattern that extends beyond the parting, a bottom for the box, filling retaining means at the top edge of the box, and flask guide pins connected with the pattern box, in contra-distinction to any part of the molding machine, whereby the proper position of said part of the pattern in respect to the pins and to the other part of the pattern is insured and maintained.

3. In a molding machine the combination of a pattern carrier, a flask frame, means for moving the carrier and frame in respect to each other to draw a pattern, means for moving the carrier and frame together to ram, a pattern box containing a filling of which the face contour controls the parting and the part of the pattern that extends beyond the parting, a half flask seated on the top of the box and adapted to be lifted therefrom by the flask frame, and flask guide pins connected with the pattern box, in contra-distinction to any part of the molding machine, whereby the proper position of said part of the pattern in respect to the pins and to the other part of the pattern is insured and maintained.

4. A molding machine having in combination a pattern carrier support and a box supported by said support and having a bottom provided with thimbles and containing a filling of plaster and stools working through the thimbles and provided with rounded ends, substantially as described.

5. A molding machine having in combination a pattern carrier support and a box supported by said support and having a bottom provided with thimbles and containing a filling of plaster and stools working through the thimbles and provided with adjusting screws having rounded heads, substantially as described.

6. A molding machine having in combination a vibrator frame, a box supported by said frame and having a bottom provided with inlets for plaster and containing a filling of plaster of which the face contour controls the parting, thimbles projecting from the bottom of the box, stools arranged to operate through the thimbles, and adjusting screws engaging the stools and having rounded heads, substantially as described.

In testimony whereof I have hereunto signed my name.

CHARLES F. HOPKINS.

Witnesses:
M. S. WOOTERS,
HOWARD H. WOOD.